April 24, 1951     R. A. BRADY     2,550,218
AUTOMOBILE SLING
Filed May 29, 1948     3 Sheets-Sheet 1
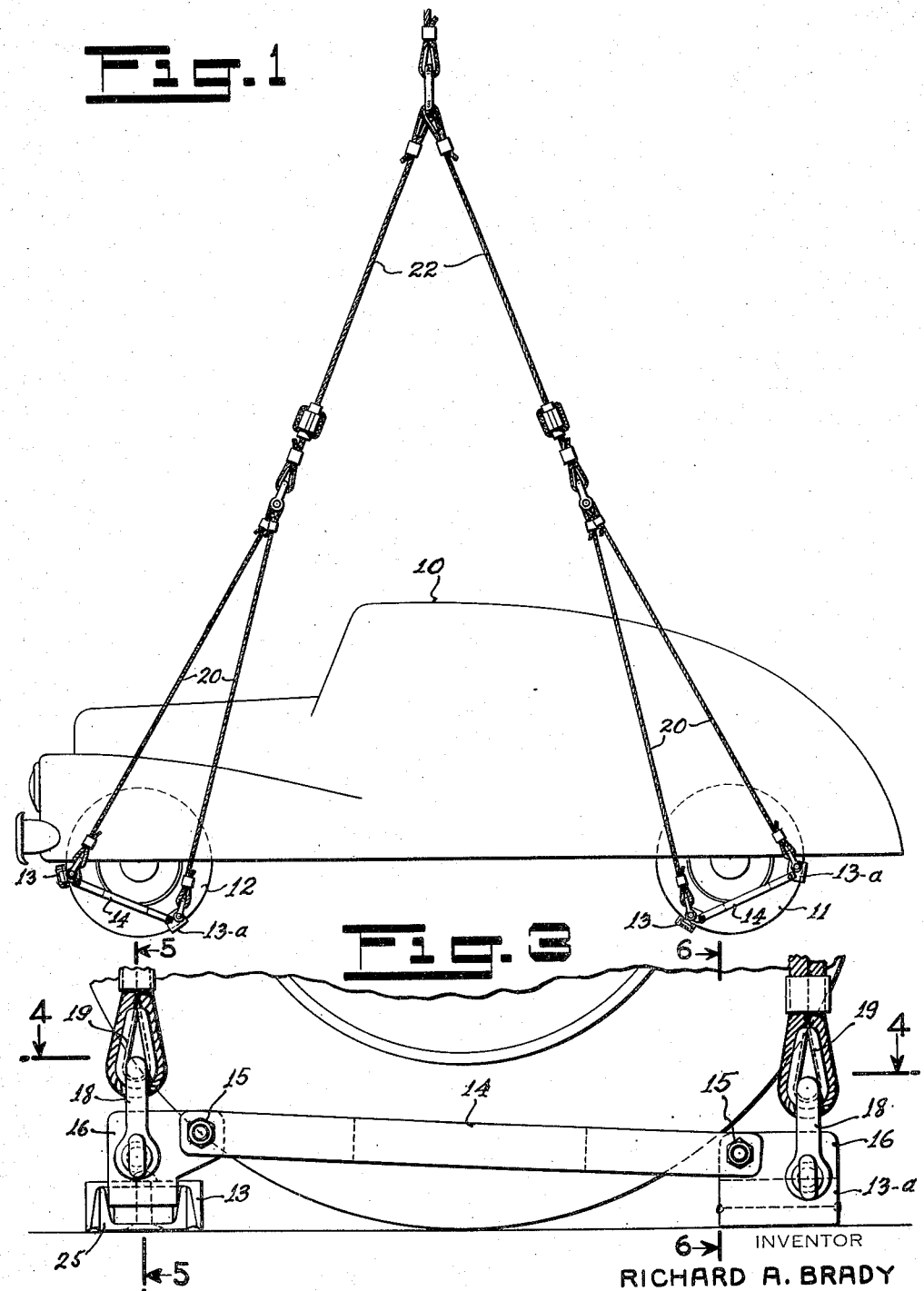
INVENTOR
RICHARD A. BRADY
BY
ATTORNEY April 24, 1951     R. A. BRADY     2,550,218
AUTOMOBILE SLING
Filed May 29, 1948     3 Sheets-Sheet 2
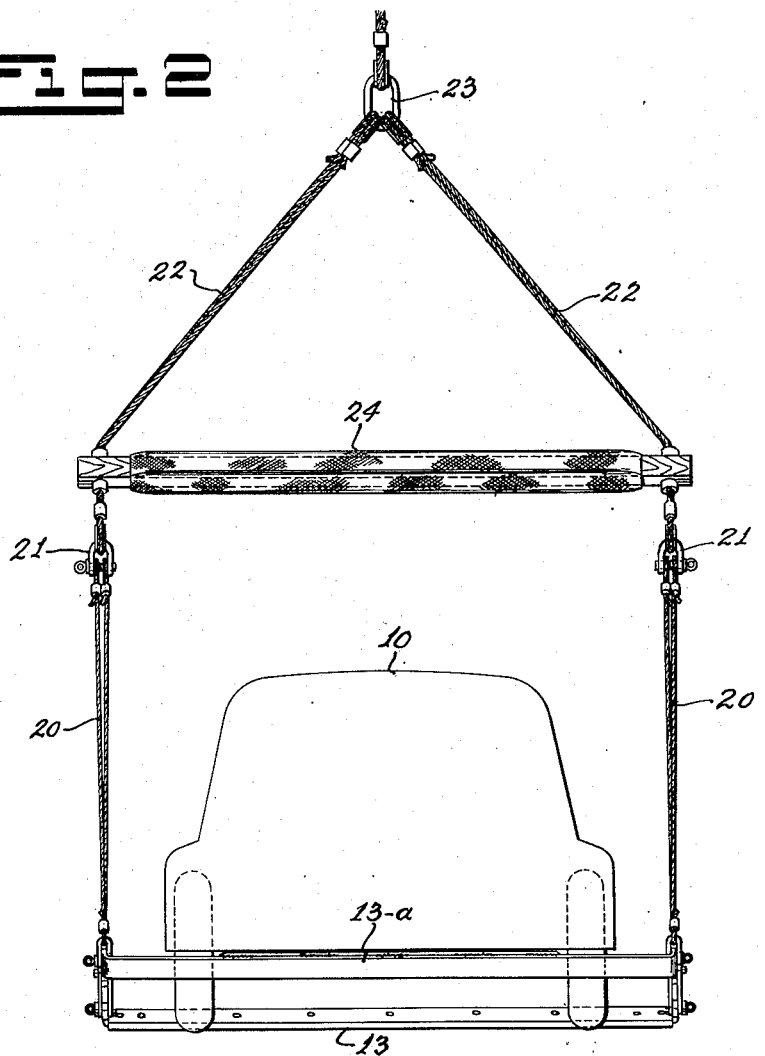
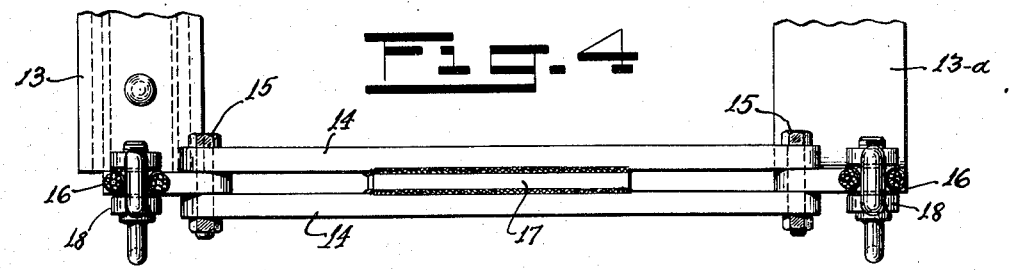
INVENTOR
RICHARD A. BRADY
BY
ATTORNEY April 24, 1951 R. A. BRADY 2,550,218
AUTOMOBILE SLING
Filed May 29, 1948 3 Sheets-Sheet 3
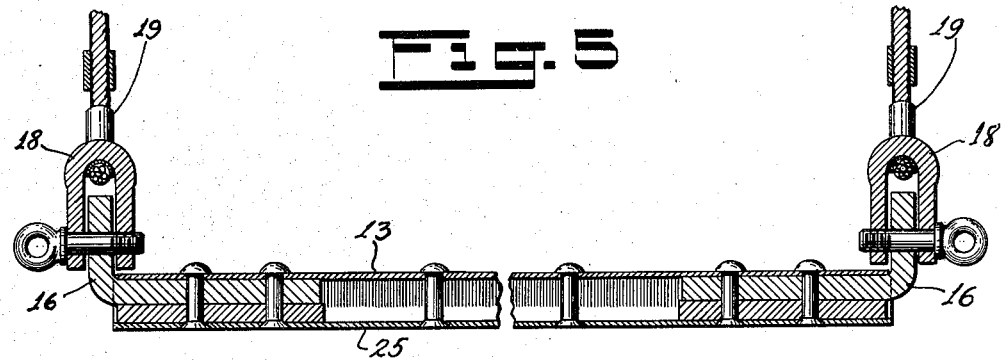
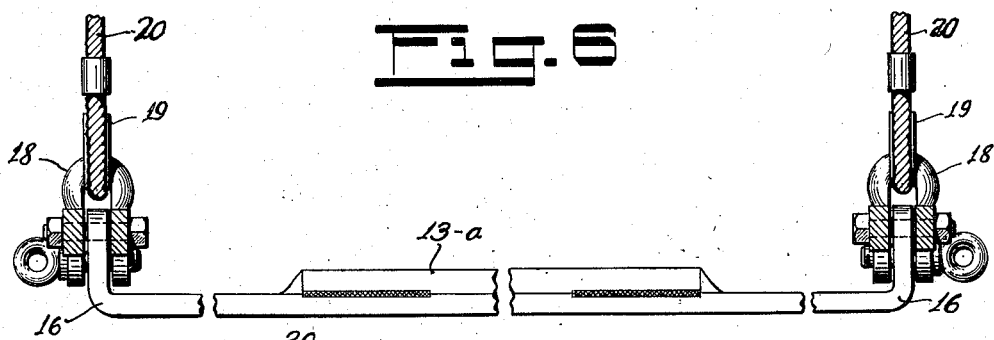
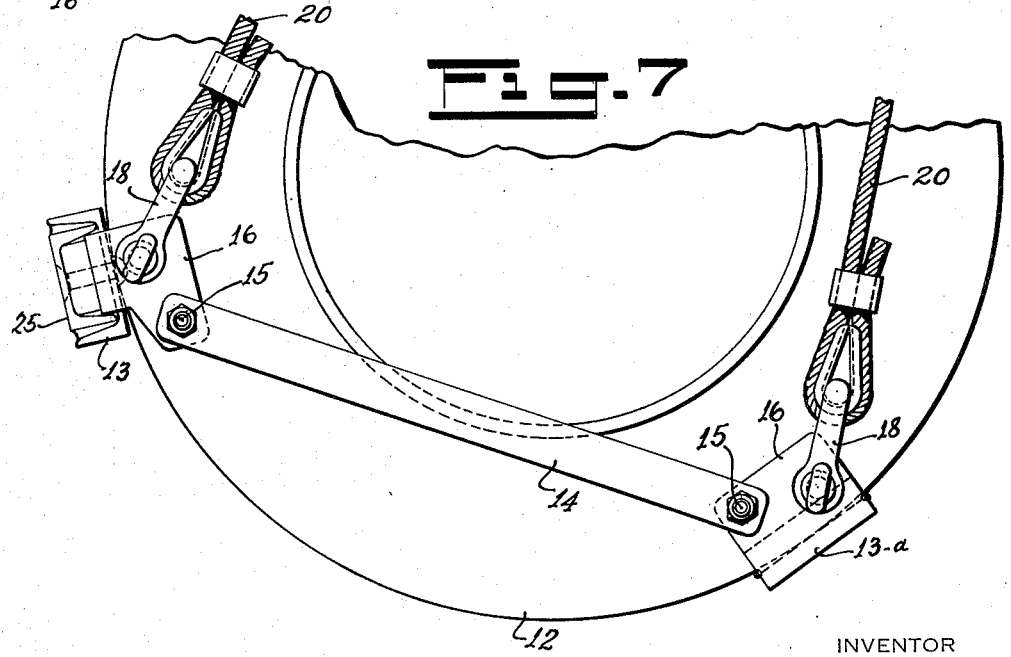
INVENTOR
RICHARD A. BRADY
BY M. Bjorndal
ATTORNEY Patented Apr. 24, 1951

2,550,218

UNITED STATES PATENT OFFICE 2,550,218

AUTOMOBILE SLING

Richard A. Brady, Hoboken, N. J.

Application May 29, 1948, Serial No. 30,051

1 Claim. (Cl. 294—67)

This invention relates to auto slings for loading automobiles on and off vessels, etc. and particularly it refers to improvements in such slings which makes it possible to lift modern cars with overhanging fenders.

Auto slings of this type have been used for years in loading automobiles for export and in unloading same from vessels and barges etc. With the advent of the new style cars, however, it was found that the older slings were unsuitable because most of these were just some sort of devices which were hooked on to the four wheels of the automobile with four wires running to a point where the crane hook would be connected. With the advent of the new cars having large overhanging fenders or mud guards, the older type of slings were found totally unsuitable and could not be used any longer because they would damage the delicate superstructure of the auto.

The object of my invention is to provide a set of auto slings which are suitable for any size car and which may be used with the modern cars having large overhanging fenders or mud guards.

Other objects and advantages of my invention will be apparent during the course of the following description:

In the accompanying drawings, forming a part of this specification, and in which like numerals are employed to designate like parts throughout the same, Figure 1 is a side elevation of a set of auto slings embodying my invention, Figure 2 is an end elevation of the same device, Figure 3 is an enlarged partial side elevation of one wheel placed in the sling, Figure 4 is a section taken along line 4—4 in Fig. 3, Figure 5 represents a section taken along line 5—5 in Fig. 3, Figure 6 represents a section taken along line 6—6 in Fig. 3, and Figure 7 represents an enlarged partial side elevation of a wheel after the same has been lifted off the ground by the sling.

In the drawings, wherein for the purpose of illustration, is shown a preferred embodiment of my invention, the numeral 10 designates an automobile with the rear wheels 11 and front wheels 12 which are placed in the sling as illustrated in Fig. 1. The slings consist of a plurality of cross beams 13 and 13a, two of which run across under the front wheels and two under the rear wheels, see Figs. 2, 3, 5 and 6. The two cross beams holding the pair of wheels are connected by means of the link 14 which is fastened by means of bolts 15 at one end of said links. The bolts 15 go through links which are doubled as shown in Fig. 4 and fasten same to the angle bracket 16 which is riveted to the cross beams 13 as indicated in Figs. 5 and 6. The two links 14 are welded together as indicated in Fig. 4 at 17 and the connection at either end is held together by a hinge so that the cross beams 13 may turn their flat surface toward the rubber tire of the wheels 11 and 12.

The angle brackets 16 have shackles 18 with thimbles 19 through which suitable wire rope 20 is connected. The other end of the wire ropes 20 are connected to shackles 21 which again are fastened by means of thimbles to wire ropes 22, the other end of which is fastened to the eye 23. The wire ropes 22 go through the padded spreaders 24 which keep the lifting ropes 20 away from the body of the car 10, see Fig. 2. The beams or spreaders 24 are padded to prevent scratching when same are lowered down upon the top of the car.

The cross beams 13 are made from an inverted channel as indicated in Fig. 3 and an angle bracket 16 is riveted to same as indicated in Fig. 5. A similar channel 25 is riveted underneath the channel 13 to increase the strength of same as shown in Fig. 3. The other cross beam 13A consists of a reinforced strap as illustrated in Fig. 6. Hence the angle bracket 16 forms a part of the body of the beam which is reinforced by means of welding a piece on same in the middle.

The operation of my invention is as follows:

The cross beams 13 and 13A are placed on the ground in a suitable position and the car is driven over same until the rear and front wheels are in the middle between the beams 13 and 13A as indicated in Fig. 3. If desired, for convenience sake, the pins of the shackles are taken out and the spreaders with the wires 22 are hoisted up over the car in a suitable position whereupon the lower ropes 20 are hooked onto shackles 21 and the car may now be lifted by the crane. In lifting the wheels will stay between the beams 13 and 13A and thus the beams will turn their flat sides toward the rubber tires as shown in Fig. 1, thus holding the wheels and the car securely in place while the lifting is performed, see Fig. 7.

It is to be understood that the form of my invention herewith shown and described is to be taken as a preferred example of the same and the various changes in the shape, size and arrangement of parts may be resorted to, without departing from the spirit of my invention or the scope of the sub-joined claim.

Having thus described my invention, I claim:

An auto sling of the character described comprising two pairs of parallel cross beams, one pair to carry the front wheels and one pair to carry the rear wheels of an automobile, each pair having a front and a rear beam, said front beams each being made of a pair of channel-shaped members of unequal size, one placed inside the other with their webs in opposite relation thereby forming a strong, light rectangular structure, each of said front beams furthermore having a longitudinal metal strap interposed between said channels and riveted to same, the ends of said straps being bent at right angles to form lifting ears, said rear beams being made from a flat section reenforced in the middle and with both ends bent at right angles to form lifting ears; a pair of flat links pivotally fastened to each end of said pairs of cross beams; a pair of spreaders being located at a distance above and parallel to said cross beams, one spreader for each pair of cross beams; a pair of strong cables connecting each end of said spreaders to the corresponding lifting ears on the ends of said cross beams, and a pair of strong cables connecting the ends of said spreaders to a central lifting eye.

RICHARD A. BRADY.

REFERENCES CITED

The following references are of record in the file of this patent:

UNITED STATES PATENTS

| Number | Name | Date |
|---|---|---|
| 2,020,174 | Derossi | Nov. 5, 1935 |
| 2,078,819 | Van Brummelen | Apr. 27, 1937 |

FOREIGN PATENTS

| Number | Country | Date |
|---|---|---|
| 388,206 | Great Britain | Feb. 23, 1933 |